(12) United States Patent
Cosentino et al.

(10) Patent No.: US 6,524,024 B1
(45) Date of Patent: Feb. 25, 2003

(54) CABLE ASSEMBLY CONNECTOR

(75) Inventors: Christopher Cosentino, Bolton (CA); Tony Maier, Aurora (CA); Jack Rietveld, Burlington (CA); Igor Demin, Windsor (CA)

(73) Assignee: Schukra Manufacturing, Inc., Etobicoke (CA)

( * ) Notice: Subject to any disclaimer, the term of this patent is extended or adjusted under 35 U.S.C. 154(b) by 0 days.

(21) Appl. No.: 09/495,869

(22) Filed: Feb. 2, 2000

(51) Int. Cl.$^7$ .................................................. F16B 9/00
(52) U.S. Cl. ........................ 403/239; 403/315; 403/316; 24/701; 24/667
(58) Field of Search ................................. 403/239, 193, 403/196, 240, 242, 279, 284, 331, 381, 315, 316, 317; 24/701, 666, 667; 297/463.1

(56) References Cited

U.S. PATENT DOCUMENTS

| | | | | | |
|---|---|---|---|---|---|
| 2,568,077 | A | * | 9/1951 | Loufek ........................ | 248/197 |
| 3,125,316 | A | | 3/1964 | Wilmhoff ..................... | 248/28 |
| 3,288,192 | A | | 11/1966 | Bollinger ................. | 151/41.75 |
| 4,373,830 | A | * | 2/1983 | Ikesue ........................ | 403/284 |
| 4,422,276 | A | | 12/1983 | Paravano ..................... | 52/511 |
| 4,470,716 | A | * | 9/1984 | Welch ........................ | 403/254 |
| 4,498,222 | A | * | 2/1985 | Ono et al. ..................... | 29/509 |
| 4,520,538 | A | * | 6/1985 | Sano et al. ..................... | 24/682 |
| 4,575,916 | A | * | 3/1986 | Naitoh et al. ................. | 29/517 |
| 5,197,780 | A | | 3/1993 | Coughlin .................. | 297/284.7 |
| 5,233,881 | A | | 8/1993 | Sayen et al. ............... | 74/502.4 |
| 5,237,889 | A | | 8/1993 | Conrad ...................... | 74/502.4 |
| 5,485,718 | A | * | 1/1996 | Dallman ...................... | 56/294 |
| 5,566,432 | A | * | 10/1996 | Perisho et al. ............. | 24/703.1 |
| 5,709,498 | A | * | 1/1998 | Sova et al. .................. | 403/196 |
| 5,762,410 | A | * | 6/1998 | Lutz ............................ | 312/111 |
| 5,774,957 | A | * | 7/1998 | Kohl et al. .................... | 24/701 |
| 5,927,580 | A | * | 7/1999 | Ward-Llewlyn ............. | 224/272 |

FOREIGN PATENT DOCUMENTS

| | | | |
|---|---|---|---|
| EP | 0 322 535 A1 | 10/1988 | |
| EP | 0434660 A2 | 6/1991 | ............ A47C/7/46 |
| FR | 2 213 186 | 8/1974 | ........... B63B/15/02 |
| JP | 57 157813 | 12/1982 | ............. F16C/1/14 |

* cited by examiner

Primary Examiner—Anthony Knight
Assistant Examiner—John B. Walsh
(74) Attorney, Agent, or Firm—Husch & Eppenberger, LLC

(57) ABSTRACT

A connection between a tensile element and an object is described having a slotted plate, a connector and a retainer. The slotted plate is attached to or part of the object and the slot has a first part and a second part. The connector has a first end that is engageable with the tensile element and a second end that can be inserted into the second part of the slot and slid towards the first part of the slot to engage the first part of the slot. The retainer inhibits the connector from moving back into the second part of the slot once it is engaged with the first part of the slot. Such a connection can be used to attach a cable assembly to a seat basket to provide adjustable lumbar support.

27 Claims, 7 Drawing Sheets

CABLE ASSEMBLY CONNECTOR

CROSS REFERENCES TO RELATED APPLICATIONS

None Applicable

STATEMENT REGARDING FEDERALLY SPONSORED RESEARCH

Not Applicable

FIELD OF THE INVENTION

This invention relates to connections between a cable, conduit, rod or other tensile element and an object and, more particularly, to a connection between a cable assembly and a lumbar support basket.

BACKGROUND OF THE INVENTION

Cables, conduits, rods and other tensile elements are used in a vast array of applications to apply a force to an object. For example, levers, valves, doors and other objects may be remotely actuated by attaching a first end of a tensile element to the object and providing an operator with a button, handle or other means to move a second end of the tensile element. Another common example is the use of a cable assembly comprising a cable inside of a conduit. A first end of the cable is attached to an object to be moved and a second end of the cable is attached to a handle, button or other operable element. The conduit is held in place so that moving the second end of the cable causes the cable to move relative to the conduit rather than moving the entire cable assembly. Such a cable assembly is useful for applying a tensile force to an object remotely without complicated arrangements of levers and rods.

In all of these applications, a connector must be used to attach the rod, cable, conduit or other tensile element to an object. Various sorts of connectors have been devised but are generally difficult or expensive to manufacture, difficult to connect to or disconnect from the object, or do not provide a secure connection to the object. For example, a tensile element can be permanently fastened to an object by welding, screws, rivets, or other fasteners. However, some such fasteners do not provide a removable connection and most require at least one tool to be used when connecting the tensile element to the object. Alternately, a tensile member can be connected to an object by a clevis, socket or other device which connects to a corresponding plate, hole, or ball etc. Although some of these connectors may be preassembled to avoid the need for tools on final assembly, these connections are generally complicated to manufacture and pre-assemble. For example, both devises and ball and socket connectors require precise machining and, typically, threaded or welded connections to the tensile element, the object, or both. Less complicated alternates such as a hook formed at the end of the tensile element, however, are often unreliable, particularly because a force applied in a reverse direction may dislodge them.

SUMMARY OF THE INVENTION

It is an object of the present invention to provide a simple connection between a tensile element and an object that is inexpensive to manufacture and allows a tensile element to be easily, securely and removably connected to an object.

The invention is directed at a connection between a tensile element and an object, the connection having a slotted plate, a connector and a retainer. The slotted plate is made of a sheet material attached to or part of the object in which a slot is formed having a first part and a second part. The second part of the slot is wider than the first part of the slot. The connector has a first end that is engageable with the tensile element and a second end that can be inserted into the second part of the slot and slid towards the first part of the slot to engage the plate in the area of the first part of the slot.

The second end of the connector has a lower abutment projecting from it that is wider than the first part of the slot but narrower than the second part of the slot so that it can pass through the second part of the slot but not the first part of the slot. The connector also has an upper abutment disposed from the first abutment. This upper abutment can be at the front of the connector or can project from the connector but at a distance from the lower abutment greater than the thickness of the sheet material. Thus, when the connector is slid into the first part of the slot, the upper abutment and lower abutment both contact the plate, but on opposite sides of the plate to resist rotation of the connector when a tensile force from the tensile element is applied to the connector.

When the connector is engaged with the plate in the first part of the slot, the retainer inhibits movement of the connector back towards the second part of the slot. The retainer is resilient and biased towards a position where it obscures at least part of the space in or adjacent to the second part of the slot. The retainer may be a separate part attached to the plate or a unitary construction of the plate made by leaving some or all of the material inside of the second part of the slot attached to one edge of the second part of the slot. The connector is releasable by first pressing the retainer against its bias to allow the connector to slide from the first part of the slot to the second part of the slot. The second part of the slot is longer than the lower abutment so that the retainer can deflect to allow the lower abutment to pass through the second part of the slot without the retainer being deformed beyond its resilient limit.

Tensile force is carried to the plate by the connector at least partially by the edges of the slot or a stop at the edge of the slot which provides a larger bearing surface if needed. The stop is preferably made of a unitary construction with the plate, for example by folding a portion of the plate within the first part of the slot upwards or downwards. The stop may be resilient to provide a shock adsorbing connection between connector and plate if needed. Further, the stop may be used to bias the connector against the retainer and the lower abutment shaped to inhibit downward motion of the retainer once the connector is engaged in the slot.

One use for such a connection is with seats having adjustable lumbar supports. The lumbar support may be made of a partially curved basket with first and second ends. The first end has a connection for a tensile element which is a cable end and the second end has a connection for a tensile element which is a conduit for the cable. By tensioning the cable, the first and second ends of the basket are pulled together which causes the basket to curve and project into the back of a person sitting on the chair.

In one aspect, the invention provides a connection between a tensile element and an object having a plate comprising, (a) a slot in the plate, the slot having a first part and a second part; and, (b) a connector having a first end engageable with the tensile element and a second end, the second end being slidably engageable with the plate by inserting the second end of the connector into the second part of the slot and sliding it generally from the second part of the slot to the first part of the slot.

In another aspect, the invention provides a connection between a tensile element and an object having a plate comprising, (a) a slot in the plate, the slot having a first part and a second part;

(b) a connector having a first end engageable with the tensile element and a second end, the second end being slidably engageable with the plate by inserting the second end of the connector into the second part of the slot and sliding it generally from the second part of the slot to the first part of the slot; and, (c) a retainer, the retainer inhibiting movement of the engaged connector from the first part of the slot to the second part of the slot.

In another aspect, the invention provides a connector for connecting a tensile element to a slot in a plate comprising, (a) a first end engageable with the tensile element;

(b) a second end, the second end having a lower abutment projecting from the connector engageable with the slot in the plate.

In another aspect, the invention provides a plate with a slot for connecting a tensile element or tensile element connector to the plate comprising, (a) a first part of the slot and a second part of the slot, the second part being wider than the first part; and, (b) a retainer, the retainer movably obscuring the space in or adjacent to the second part of the slot near its boundary with the first part of the slot.

In another aspect, the invention provides a plate with a slot for connecting a tensile element or tensile element connector to the plate comprising, (a) a first part of the slot and a second part of the slot, the second part being wider than the first part; and, (b) a retainer, wherein the retainer is resilient and biased towards a position where it at least partially obscures the space in or adjacent to the second part of the slot.

In another aspect, the invention provides a connection between a tensile element and an object having a plate comprising, (a) a slot in the plate, the slot having a first part and a second part;

(b) a connector having a first end engageable with the tensile element and a second end, the second end being slidably engageable with the plate by inserting the second end of the connector into the second part of the slot and sliding it generally from the second part of the slot to the first part of the slot; and, (c) a retainer, the retainer inhibiting movement of the engaged connector from the first part of the slot to the second part of the slot, wherein the object is a basket for providing lumbar support in a seat and the basket has a first end an a second end, the first end has a connection for a tensile element which is a cable and the second end has a connection for a tensile element which is a conduit for the cable.

BRIEF DESCRIPTION OF THE DRAWINGS

An embodiment of the invention will be described with reference to the following drawings.

DESCRIPTION OF PREFERRED EMBODIMENTS

Figure 1:
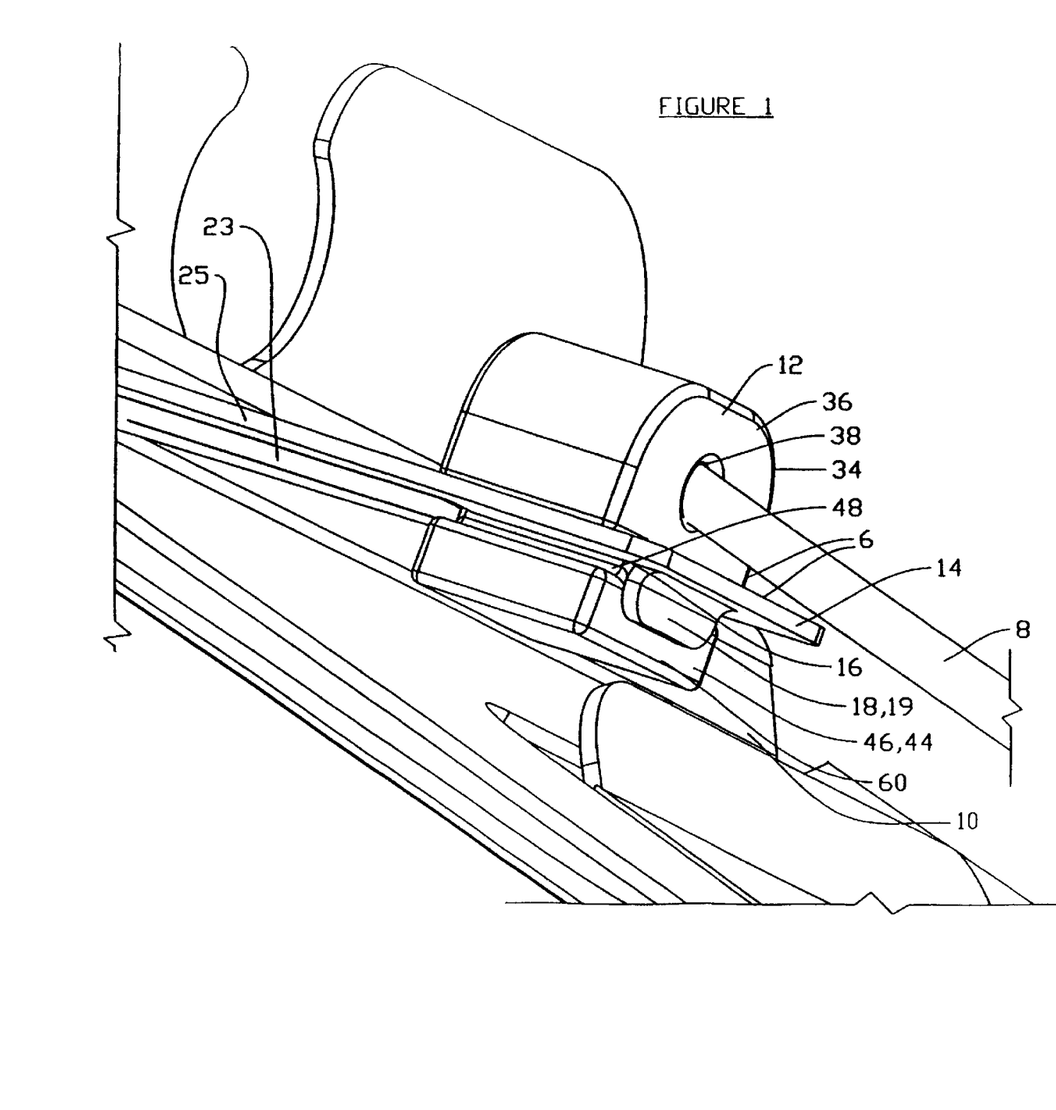
FIG. 1 is a perspective view of a connection according to the invention.

Referring now to FIG. 1, a connection 6 is shown between a tensile element 8 and an object 10. The connection 6 has a connector 12 and a plate 14. The connector 12 is shown separately in FIGS. 3A and 3B and the plate 14 is shown separately in FIG. 2.

Figure 2:
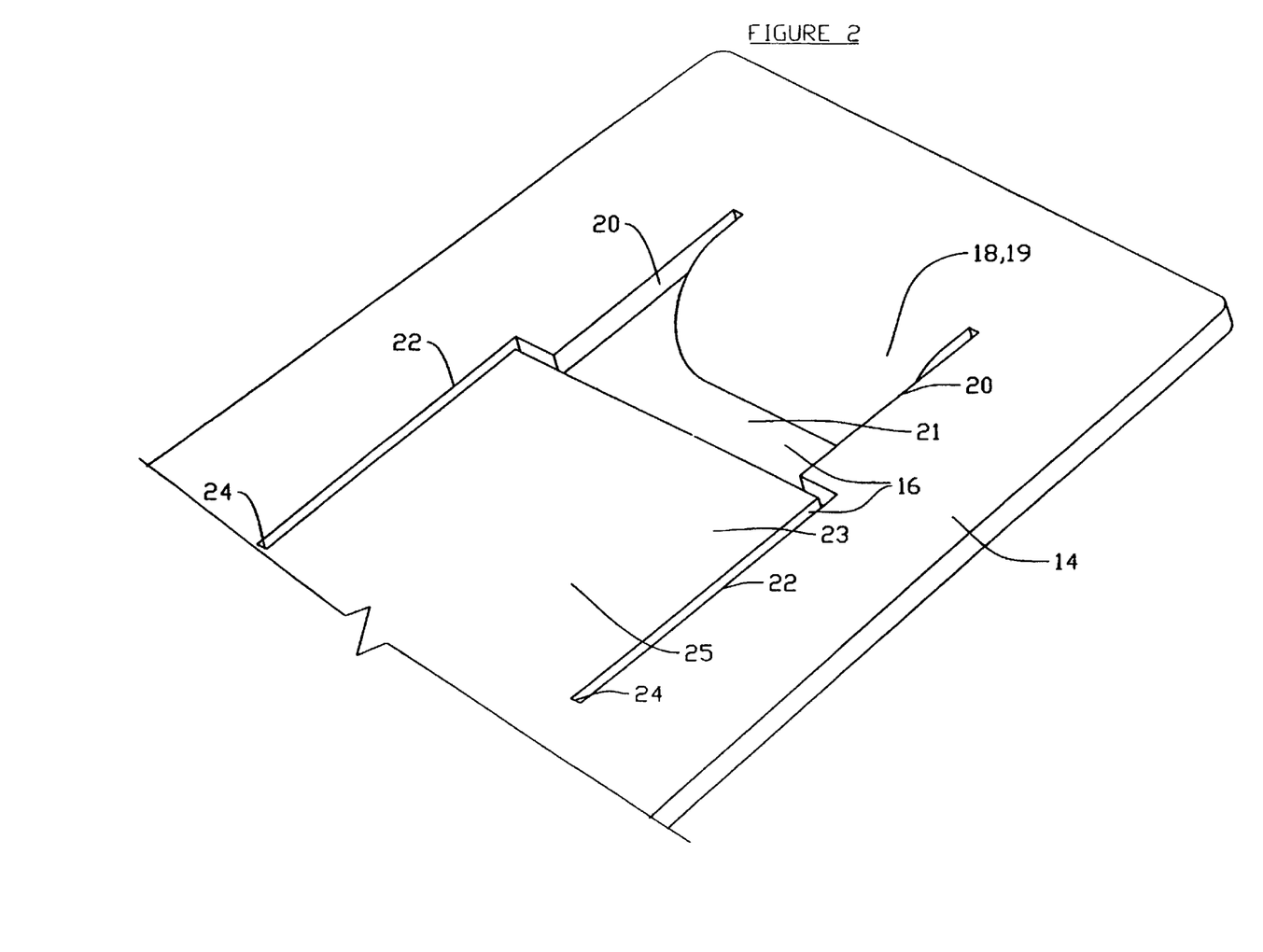
FIG. 2 is a perspective view of a slotted plate according to the invention.

Referring now to FIG. 2, the plate 14 has a slot 16 having a stop 18 at a first end 19. Adjacent to the first end 19 are first edges 20 on the perimeter of a first part 21 of the slot 16. Adjacent to the first part 21 of the slot 16 are second edges 22 of the slot 16 on the perimeter of a second part 23 of the slot 16. A second end 24 of the slot 16 is at the end of the slot 16 opposite the first end 19.

The dimensions of the slot 16 and other parts of the embodiment will be described according to the following frame of reference. Length is measured along a line extending from the first end 19 of the slot 16 to the second end 24 of the slot 16 and generally parallel to the first edges 20 and second edges 22. Width is measured perpendicular to the length in a plane parallel to the plate 14. Depth or thickness is measured perpendicular to length and width. When referring to the slot 16, where a stop 18 protrudes into the space within or adjacent the slot 16, measurements are made from the stop 18 and not from the edge of the slot 16. References to dimensions of the connector 12 follow the same frame of reference when the connector 12 is engaged in the plate 14 as shown in FIG. 1.

Referring now to FIGS. 1 and 2, the stop 18 provides a bearing surface for the connector 12 on the plate 14. For low stress applications, the stop 18 may be simply an edge of the plate 14 but a stop as shown provides additional bearing area and is preferred. When formed of a resilient material with a sufficient radius of curvature, the stop 18 can also cushion shocks to the connector 12 or plate 14.

The stop 18 is preferably made as part of a unitary construction with the plate 14 by cutting out the slot 16 so as to leave a portion of the plate 14 attached to one edge of the first part 21 of the slot 16. This piece of the plate 14 is then bent upwards or downwards to form the stop 18. The plate 14 is preferably formed of a resilient material that can nevertheless be formed by bending it beyond its elastic limit, or by the application of heat etc. Sheet steel, aluminum or various plastics, for example, may be appropriate for different applications.

The stop 18 as shown in FIGS. 1 and 2 is located at the first end 19 of the slot 16. In this location, the stop 18 provides additional bearing area to resist forces applied by a tensile element aligned with the length of the slot 16. If the connection 6 will be used to transfer forces perpendicular to the length of the slot, then the stop 18 would be located on one of the first edges 20.

Now referring to FIG. 2, a retainer 25 is shown which obscures part of the space in or adjacent to the second part 23 of the slot 16. Although the retainer 25 is preferably in the plane of the plate 14, the word "adjacent" is meant to indicate that the retainer 25 could be located in a similar location in parallel planes above or below the plate 14 which are close enough to the plate 14 to allow the retainer to perform its functions.

The functions of the retainer 25 will be described in more detail further below but include inhibiting the connector 12, when engaged to the plate 14, from moving towards the second part 23 of the slot 16 where it might disengage from the slot 16. In some applications, the retainer 25 is not necessary and the connection 6 is sufficiently secure without it. For example, the connector 12 can be sized to provide a friction fit to the plate 14. Alternatively, the tensile element 8 may be kept under tension once attached to the object 10 which will inhibit the connector 12 from moving in the slot 16.

Although the retainer 25 may be a separate component, it is preferably a unitary construction with the plate 14. Like the stop 18, the retainer 24 can be a part of the plate 14 made by cutting out the slot 16 so as to leave a portion of the plate 14 attached to one edge of the second part 23 of the slot 16. The retainer 24 can be attached to either of the second edges 22 but is preferably attached to the second end 24 of the slot 16.

Figures 3A, 3B:
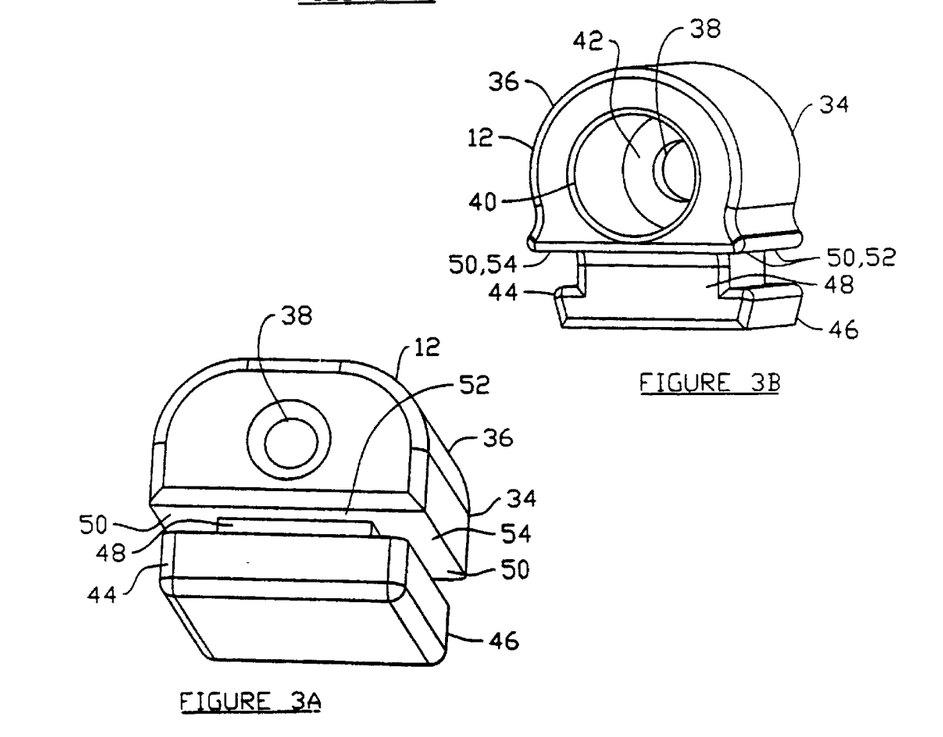
FIGS. 3A and 3B are perspective views of connectors according to the present invention.
Figure 3C:
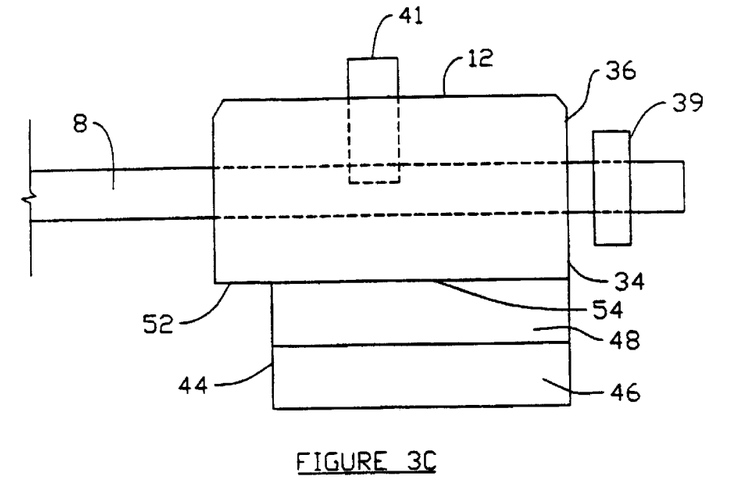
FIG. 3C is an elevation view of the connector of FIG. 3A.

Referring now to FIGS. 3A and 3B, two versions of a connector 12 are shown. Each connector 12 has a body 34 with a first end 36 engageable with a tensile element. In the connector 12 of FIG. 3A, the first end 36 has a hole 38 for insertion of a tensile element. Preferably, the connector 12 is a casting with the tensile element cast in place in the hole 38 or made to tolerances such that the tensile element 8 is a friction fit in the hole 38. However, many alternate methods might be appropriate for different applications. For example, as shown in FIG. 3C, the tensile element 8 can be pushed through the hole 38 and provided with a collet, nut, or other obstruction 39 on its end to keep it from passing back out through the hole. In other applications, the tensile element 8 can be held in the hole by a set screw or pin 41 or by crimping the connector 12. In the connector 12 of FIG. 3B, the first end 36 is adapted to receive a tensile element which is the conduit part of a cable assembly. In this case, the hole 38 is sized to permit the cable to pass through it. A second countersunk hole 40 is sized to accept the end of the conduit to hold it in position and provide a bearing surface 42 for the end of the conduit. The preferred material for the connector 12 is primarily chosen based on the force to be applied to it and compatibility with the plate 14 and tensile element 8 and may be, for example, steel, aluminum or plastic.

Referring still to FIGS. 3A and 3B, a second end 44 of the connector has a lower abutment 46, a post 48 and an upper abutment 50. The lower abutment 46 extends from the second end to be wider than the post 48. The upper abutment 50 has two principle surfaces. A first surface 52 extends from the second end 44 in a direction parallel with the axis of the hole 38. Second surfaces 54 extend from the second end 44 to be wider than the post 48.

Figure 4:
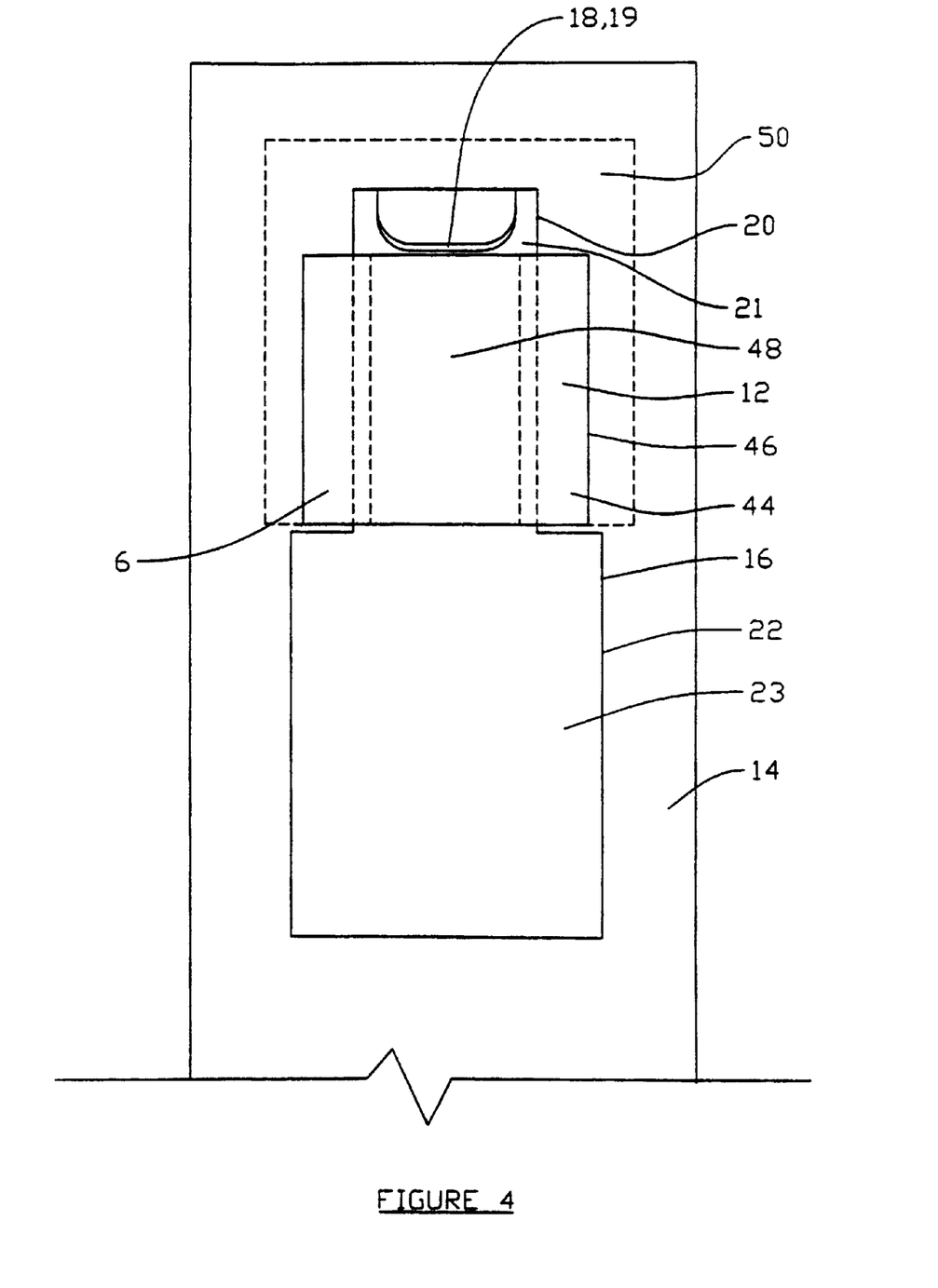
FIG. 4 is a plan view of a connection according to the present invention.

Referring now to FIG. 4, a portion of the plate 14 is shown without the retainer 25 and with a connector 12 engaged to the plate 14 in the area of the first part 21 of the slot 16. The second part 23 of the slot 16 is wider than the first part 21 of the slot 16. The second end 44 of the connector 12 is shown protruding through the plate 14 and covering a portion of the first part 21 of the slot 16. The width of the lower abutment 46 is less than the width of the second part 23 of the slot 16 so that the lower abutment 46 can pass through the second part 23. Conversely, the width of the lower abutment 46 is greater than the width of the first part 21 of the slot 16 so that lower abutment 46 will engage the plate 14 in the area of the first part 21. Preferably, the upper abutment 50, shown in dashed lines, is also greater in width than the first part 21 of the slot 16 to keep the connector 12 from falling through the plate 14. More preferably, the upper abutment 50 is also greater in width than the second part 23 of the slot 16 to keep the connector 12 from falling through the plate 14 when the lower abutment 46 is passed through the second part 23 of the slot 16. The post 48 is narrower than the first part 21 of the slot 16 to allow the connector 12 to slide from the second part 23 to the first part 21 of the slot 16. Similarly, the lower abutment 46 and upper abutment 50 are spaced apart from each other by at least the thickness of the plate 14 to allow the connector 12 to slide from the second part 23 to the first part 21 of the slot 16.

Figure 5A:
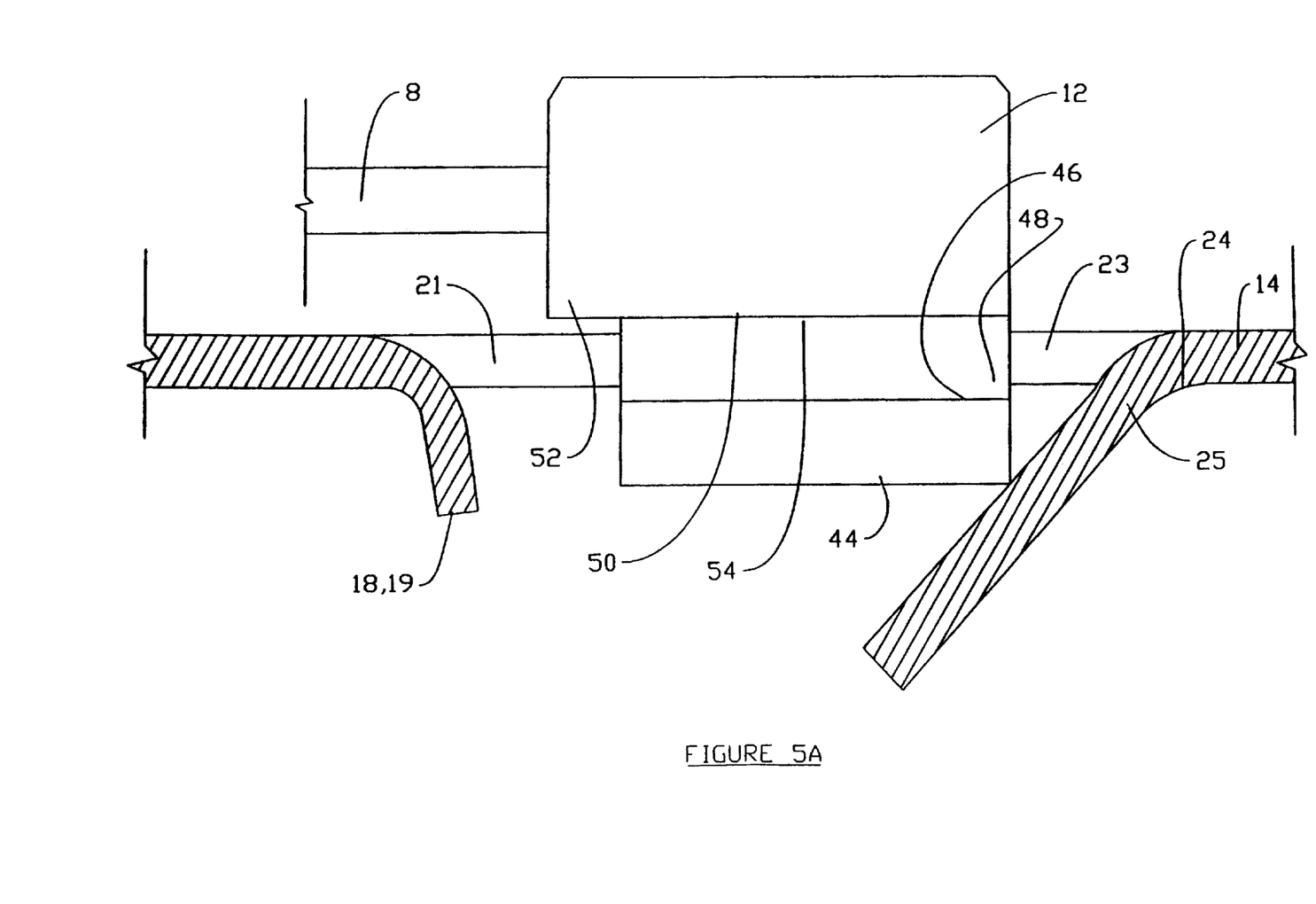
FIGS. 5A and 5B are partially cross-section elevations of a connection according to the present invention.

Now referring to FIGS. 5A, the connector 12 is shown being inserted into the second part 23 of the slot 16. The retainer 25 is deflected downwards by the second end 44 of the connector 12 which is inserted until the lower abutment 46 has passed through the plate 14. The length of the second part 23 of the slot 16 is longer than the length of the lower abutment 46 so that the retainer 25 can bend without becoming permanently deformed.

Figure 5B:
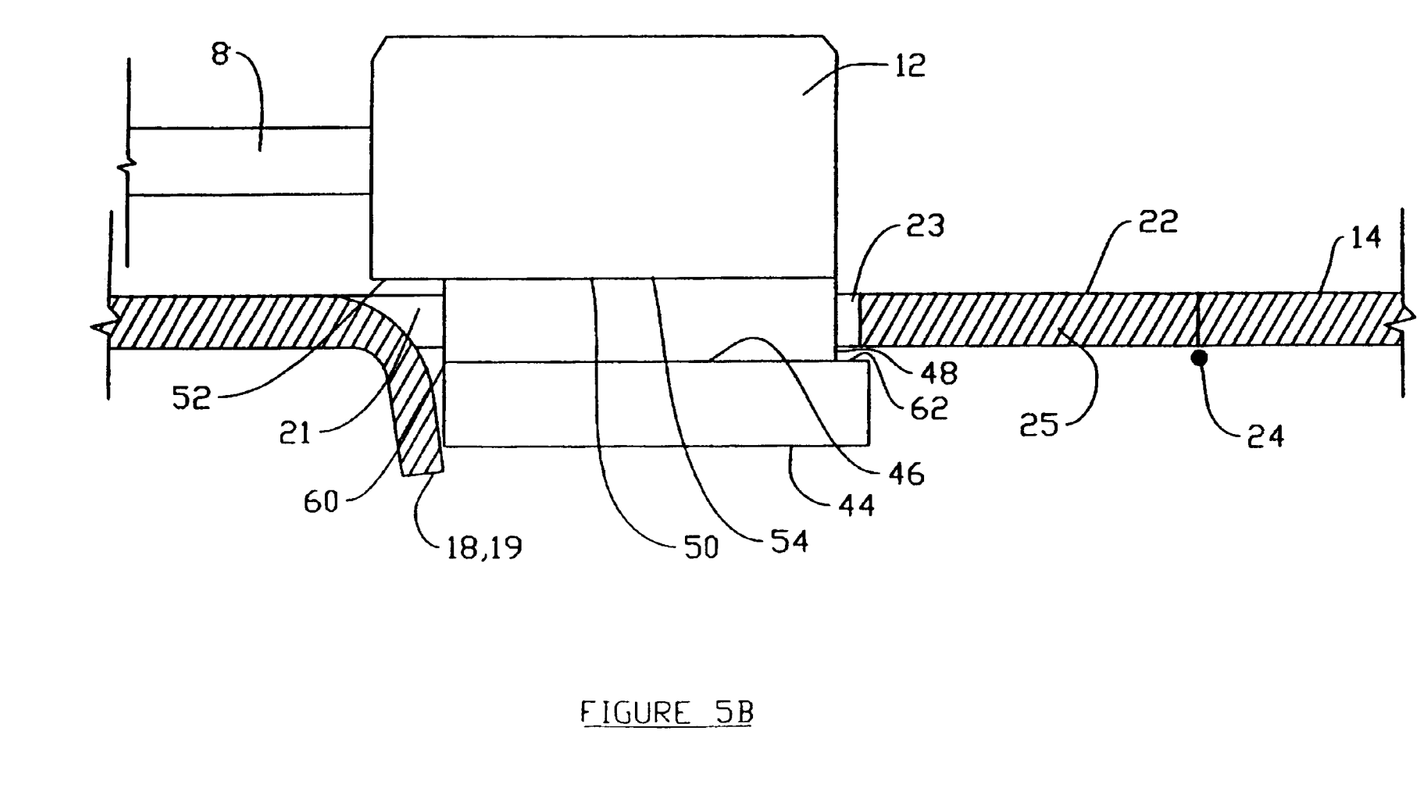

Now referring to FIG. 5B, the connector has been slid to engage the first part 21 of the slot 16. A front face 60 of the connector 12 contacts the stop 18 when force is applied to the tensile element 8. Moment forces created by the tensile element 8 are resisted by a combination of contact between the lower abutment 46 and upper abutment 50 on opposite sides of the plate 14. The upper abutment 50 may contact the plate 14 at the first surface 52, the second surface 54, or both. The size of the moment forces created by the tensile element 8 can be reduced by locating the tensile element 8 in the connector 12 such that the tensile element 8 is close to the plate 14 or in the plane of the plate 14 when the connector 12 is engaged with the plate 14.

Still referring to FIG. 5B, the retainer 25 has sprung back into the plane of the plate 14. The connector 12 is now inhibited from moving back towards the second part 23 of the slot 16 which might allow it to disengage from the plate 14. However, if an operator wants to disassemble the connection, the retainer 25 can be forced downwards to allow the connector 12 to slide towards the second part 23 of the slot 16.

The length of the second end 44 of the connector 12 is defined as the length between the front face 60 and the distal edge of the post 48. Preferably, the length of the second end 44 of the connector 12 and the length of the retainer 25 are such that there is little space between the post 48 and the retainer 25. In this way, the connector 12 has only a very limited range of movement and, if force is applied in a reverse direction, the retainer 24 keeps the connector 12 from moving backwards in the slot 16 and disengaging the plate 14.

More preferably, the length of the second end 44 of the connector 12 is substantially the same as the length of the first part 21 of the slot 16 and the retainer 25 is substantially as long as the second part 23 of the slot 16. Similarly, if the retainer 25 were attached to one of the second edges 22, then it would be preferable for the retainer 25 to be located so as to at least partially obscure the boundary between the first part 21 and the second part 23 of the slot 16.

The distances between the upper abutment 42 and the lower abutment 44 can also be chosen to be only slightly larger than the thickness of the plate 14. Alternatively, the distance between the upper abutment 42 and the lower abutment 44 can be chosen greater than the thickness of the plate 14 so that the connector 12 can rotate forward slightly by a fixed amount. The fixed amount of rotation allows the connector 12 to be rotated as it slides into the slot 16 which reduces the total amount of deflection required of the retainer 24.

In an embodiment shown in FIG. 5B, the lower abutment 46 has a surface which extends from the post 48 in the direction of the retainer 25 so that when the connector 12 is engaged in the slot 16, the retainer 25 is prevented from moving downwards to release the connector 12. To install and release the connector 12, the connector is pushed against the stop 18 to deform the stop 18 enough to allow the retainer 25 to pass by the lower abutment 46. The stop 18 is biased to move the connector 12, when the connector 12 is engaged to the plate 14, to a position where the retainer 25 is prevented from moving downwards to release the connector 12.

Figure 6:
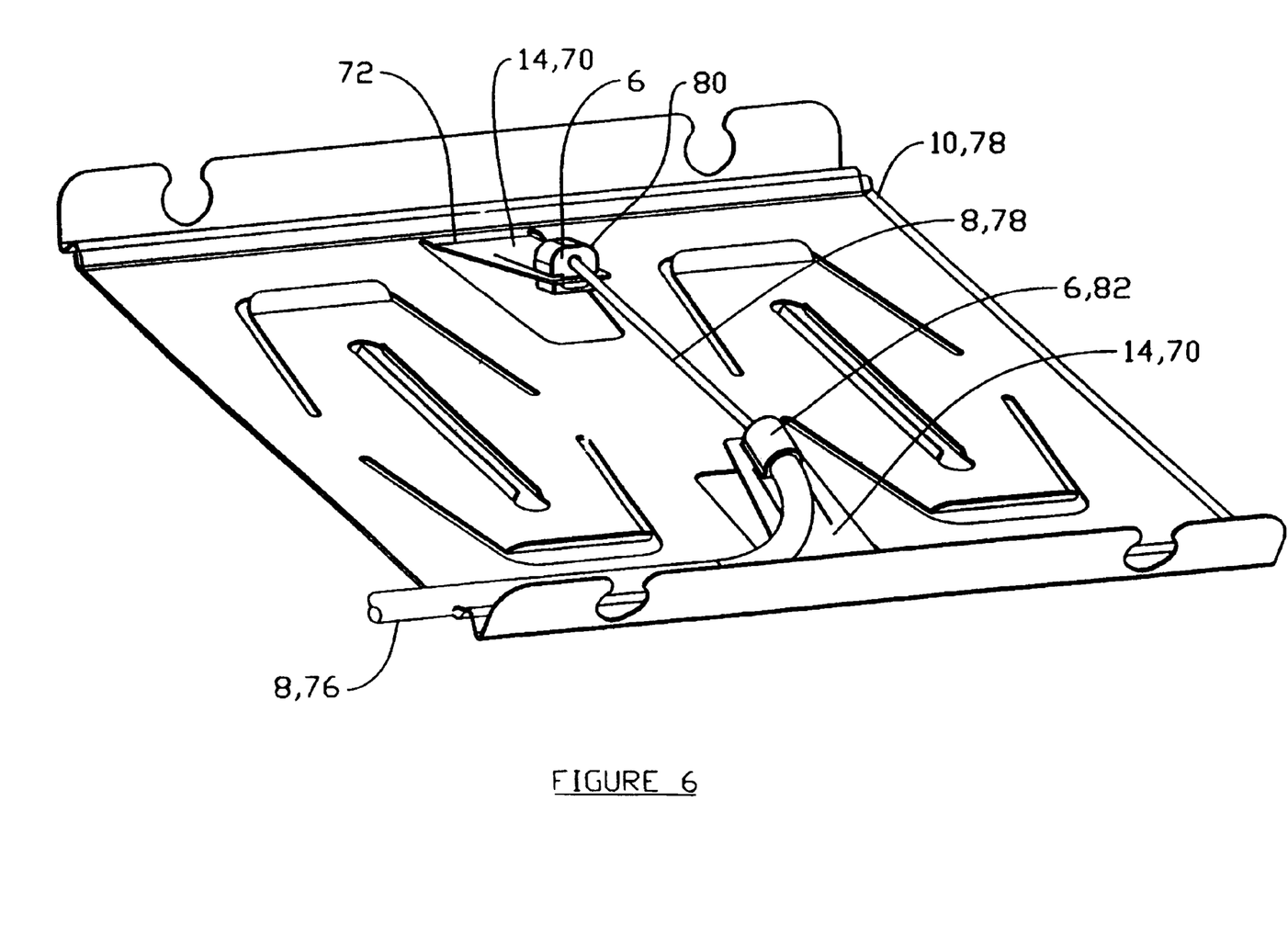
FIG. 6 is a perspective view of a cable assembly connection used with an adjustable lumbar basket according to the present invention.

Now referring to FIGS. 1 and 6, ideally, the plate 14 is preferably part of the object 10 where the object that is formed of a sheet material in the area of the connection 6. In such a case, the plate 14 can be a non-distinct part of the object 10 or a tab 70 extending from the object 10 along a fold line 72. Where the tensile element 8 is partially perpendicular to the fold line 72, the tab 70 may pivot in response to changing forces on the tab 70.

Referring now to FIG. 6, connections 6 are shown between a cable 74 and a first end of a basket 78 of a lumbar support for a seat and between a conduit 76 and a second end of the basket 78. A connection 6 as shown in FIG. 3A is used at the cable end connection 80 and a connection 6 as shown in FIG. 3B is used at the conduit end connection 82. When the cable 74 is retracted into the conduit 76, the length of cable 74 between the two connections 6 is shortened. The basket 78, preferably made of a resilient sheet material, is compressed causing it to bow outwards to provide lumbar support. As the basket 78 bows outwards, the tabs 70 may also curve in response to the changing angle between the cable 74 and the first and second ends of the basket 78.

In this embodiment, the plates 14 are not separate elements, but rather a portion of the basket 78 which reduces the number of parts required. A living hinge is created in the plate 14 or between the plate 14 and the basket 78 allowing the basket 78 to curl with minimal rotation of the tensile element 8 relative to the connector 12.

The length of cable 74 that can extend from the conduit 76 can be chosen such that there is at least a slight curl to the basket 78 at all times. The slight curl keeps the cable 74 in tension which inhibits the connectors 12 from disengaging the slots 16 and may make retainers 25 unnecessary. Further, the basket 78 is most difficult to bend when it is flat or nearly flat. A slight curl in the basket 78 when the basket 78 is in its most flattened position reduces the tensile force required to move the basket 78 from this position and the maximum tensile force which an operator will have to apply to the basket 78 to move it. The tensile force required to move the basket 78 can also be lessened by locating the tensile element 8 in the connector 12 such that it is as far away from the plate 14 as possible when the connector 12 is engaged in the plate 14.

It is to be understood that what has been described is a preferred embodiment to the invention. If the invention nonetheless is susceptible to certain changes and alternative embodiments fully comprehended by the spirit of the invention as described above, and the scope of the claims set out below.

We claim:

1. A connection between a tensile element and a seat basket providing lumbar support in a seat comprising,
   (a) a plate extending from the seat basket, the plate having a slot, the slot having a first part and a second part, wherein the second part of the slot is wider than the first part of the slot;
   (b) a connector having a first end engageable with the tensile element and a second end, the second end being slidably engageable with the plate by inserting the second end of the connector into the second part of the slot and sliding it generally from the second part of the slot to the first part of the slot; and
   (c) a retainer, the retainer inhibiting movement of the engaged connector from the first part of the slot to the second part of the slot;
   (d) wherein the second end of the connector comprises a lower abutment wider than the first part of the slot and less wide than the second part of the slot, and a post connecting the lower abutment to an upper abutment engageable with the plate on a side opposite a side of the plate engageable by the lower abutment; and
   (e) wherein the post is shaped to provide a friction fit between the second end of the connector and the first part of the slot.

2. The invention of claim 1 wherein the upper abutment is wider than the first part of the slot.

3. The invention of claim 2 wherein the upper abutment is wider than the second part of the slot.

4. The invention of claim 1, wherein the post has a rectilinear cross-section.

5. The invention of claim 1, wherein the post has a flat, parallel opposed sides for engaging the slot.

6. A connection between a tensile element and a seat basket providing lumbar support in a seat, comprising,
   (a) a plate extending from the seat basket, the plate having a slot, the slot having a first part and a second part;
   (b) a connector having a first end engageable with the tensile element and a second end, the second end being slidably engageable with the plate by inserting the second end of the connector into the second part of the slot and sliding it generally from the second part of the slot to the first part of the slot; and,
   (c) a retainer, the retainer inhibiting movement of the engaged connector from the first part of the slot to the second part of the slot, wherein the retainer is resilient and biased towards a position where it at least partially obscures the space in or adjacent to the second part of the slot.

7. The invention of claim 6 wherein the retainer is a part of the plate.

8. The invention of claim 7 wherein the retainer obscures substantially all of the space in or adjacent to the second part of the slot.

9. The invention of claim 6 wherein the tensile element is generally aligned with the length of the slot.

10. The invention of claim 6 wherein the first part of the slot has a first end opposite the second part of the slot, the first end having a stop made of a unitary construction with the plate.

11. The invention of claim 10 wherein the length of the second end of the connector is substantially equal to the length of the first part of the slot and the retainer at least partially obscures the second part of the slot substantially adjacent to the boundary between the first part of the slot and the second part of the slot.

12. The invention of claim 11 wherein the retainer is a unitary construction with the plate.

13. The invention of claim 12 wherein the retainer is attached to the plate at a second end of the slot opposite the first end of the slot.

14. The invention of claim 13 wherein the second part of the slot is longer than the lower abutment.

15. The invention of claim 6 wherein the retainer is a unitary construction with the plate and is attached to the plate at a second end of the slot opposite the first part of the slot.

16. The invention of claim 15 wherein the retainer is substantially the length of the second part of the slot.

17. The invention of claim 6 wherein the connector is releasable by first pressing the retainer against its bias to allow the connector to slide from the first part of the slot to the second part of the slot.

18. The invention of claim 6 wherein the second part of the slot is longer than the lower abutment.

19. A connection between a tensile element and an object having a plate comprising,
   (a) a slot in the plate, the slot having a first part and a second part;
   (b) a connector having a first end engageable with the tensile element and a second end, the second end being slidably engageable with the plate by inserting the second end of the connector into the second part of the slot and sliding it generally from the second part of the slot to the first part of the slot; and
   (c) a retainer, the retainer inhibiting movement of the engaged connector from the first part of the slot to the second part of the slot, wherein the retainer is resilient and biased towards a position where it at least partially obscures the space in or adjacent to the second part of the slot;
   (d) wherein the plate is a pivotable tab of the object.

20. The invention of claim 19 wherein the plate is made of a unitary construction with the object.

21. A connection between a tensile element and an object having a plate comprising,
   (a) a slot in the plate, the slot having a first part and a second part;
   (b) a connector having a first end engageable with the tensile element and a second end, the second end being slidably engageable with the plate by inserting the second end of the connector into the second part of the slot and sliding it generally from the second part of the slot to the first part of the slot; and
   (c) a retainer, the retainer inhibiting movement of the engaged connector from the first part of the slot to the second part of the slot, wherein the retainer is resilient and biased towards a position where it at least partially obscures the space in or adjacent to the second part of the slot;
   (d) wherein the object is a basket for providing lumbar support in a seat and the basket has a first end and a second end, the first end has a connection for a tensile element which is a cable and the second end has a connection for a tensile element which is a conduit for the cable.

22. The invention of claim 21 wherein said basket first end connection for a tensile element which is a cable and said basket second end connection for a tensile element which is a conduit for the cable are each substantially perpendicular to the cable.

23. A connection between a tensile element and an object having a plate comprising,
   (a) a slot in the plate, the slot having a first part and a second part;
   (b) a connector having a first end engageable with the tensile element and a second end, the second end being slidably engageable with the plate by inserting the second end of the connector into the second part of the slot and sliding it generally from the second part of the slot to the first part of the slot; and
   (c) a retainer, the retainer inhibiting movement of the engaged connector from the first part of the slot to the second part of the slot, wherein the retainer is resilient and biased towards a position where it at least partially obscures the space in or adjacent to the second part of the slot;
   (d) wherein the first part of the slot has a stop opposite the second part of the slot, the stop being resilient to bias the connector against the retainer.

24. The invention of claim 23 wherein the lower abutment inhibits downward motion of the retainer while the connector is biased against the retainer by the stop.

25. The invention of claim 24 wherein the connector is releasable by first moving the connector against the bias of the stop and then pressing the retainer past the lower abutment.

26. The invention of claim 24 wherein the stop is made of a unitary construction with the sheet material.

27. A connection between a tensile element and an object having a plate comprising,
   (a) a slot in the plate, the slot having a first part and a second part;
   (b) a connector having a first end engageable with the tensile element and a second end, the second end being slidably engageable with the plate by inserting the second end of the connector into the second part of the slot and sliding it generally from the second part of the slot to the first part of the slot; and
   (c) a retainer, the retainer inhibiting movement of the engaged connector from the first part of the slot to the second part of the slot, wherein the retainer is resilient and biased towards a position where it at least partially obscures the space in or adjacent to the second part of the slot;
   (d) wherein the first part of the slot has a first end opposite the second part of the slot, the first end having a stop made of a unitary construction with the plate; and
   (e) wherein the stop is resilient.

* * * * *